United States Patent [19]

Fujiki et al.

[11] Patent Number: 5,536,803
[45] Date of Patent: Jul. 16, 1996

[54] ADHESIVE SILICONE COMPOSITIONS

[75] Inventors: Hironao Fujiki; Shigeki Shudo; Toshiaki Takahashi; Hiroyasu Hara; Takeshi Miyao, all of Usui-gun, Japan

[73] Assignee: Shin-Etsu Chemical Co., Ltd., Tokyo, Japan

[21] Appl. No.: 461,012

[22] Filed: Jun. 5, 1995

[30] Foreign Application Priority Data

Jun. 6, 1994 [JP] Japan .................. 6-147050

[51] Int. Cl.$^6$ .................................................. C08G 77/08
[52] U.S. Cl. ..................... 528/15; 528/31; 525/478; 525/479
[58] Field of Search ................. 528/15, 31; 525/478, 525/479

[56] References Cited

U.S. PATENT DOCUMENTS 5,420,222  5/1995  Stepp et al. .................. 528/31
5,436,308  7/1995  Durfee et al. ................. 528/15

Primary Examiner—Melvyn I. Marquis
Attorney, Agent, or Firm—Millen, White, Zelane & Branigan

[57] ABSTRACT

An adhesive silicone composition comprising a diorganopolysiloxane, an organohydrogenpolysiloxane, and a platinum catalyst is blended with an organohydrogenpolysiloxane having at least two hydrogen atoms each bonded to a silicon atom in a molecule and containing an aromatic ring-bearing hydrocarbon radical in an amount of at least 12 mol % of the entire monovalent organic radicals bonded to silicon atoms, or a compound containing at least one hydrogen atom bonded to a silicon atom in a molecule and having a radical of two benzene rings separated by —$R^{13}R^{14}$Si—, —$R^{13}R^{14}$SiO—, —O$R^{13}R^{14}$SiO— or —$R^{13}R^{14}$SiO$R^{13}R^{14}$Si— wherein $R^{13}$ and $R^{14}$ are a monovalent hydrocarbon radical. The composition firmly adheres to organic resins, but is readily releasable from metal molds.

1 Claim, 3 Drawing Sheets

ADHESIVE SILICONE COMPOSITIONS

BACKGROUND OF THE INVENTION

1. Field of the Invention

This invention relates to adhesive silicone compositions providing cured products having improved adhesion to various organic resins and improved release from molds.

2. Prior Art

A number of methods have been proposed for providing a bond between addition curing type silicone rubber and organic resins. It is known, for example, to form a bond by applying a primer to a surface of molded resin, applying uncured silicone rubber material thereto and curing the silicone rubber to the resin. Another typical method is by curing self-adhesive silicone rubber compositions directly to molded resin. For the self-adhesive silicone rubber compositions, a number of proposals have been made on their tackifier component.

As another approach, it is known from U.S. Pat. Nos. 4,582,762, 4,686,124, 4,814,231 and 4,834,721 corresponding to Japanese Patent Publication (JP-B) No. 34311/1990 to add an organohydrogenpolysiloxane containing at least 30 mol % of hydrogen atoms directly attached to silicon atoms to an organic resin (e.g., olefin resin) so that the resin is bondable with addition curing type silicone rubber. JP-B 45292/1988 discloses integration by physically fitting silicone rubber within molded organic resin. In EP 276,790A and CA 1304206 corresponding to Japanese Patent Application Kokai (JP-A) No. 183843/1988, a compound having an aliphatic unsaturated group and a hydrolyzable group attached to a silicon atom is grafted to an olefin resin and silicone rubber is bonded and integrated with the grafted olefin resin.

However, several problems arise with these prior art methods for integrating silicone rubber and organic resin into a one-piece article. The primer method is cumbersome in that a once molded resin shape must be taken out of the mold before the primer can be applied thereto. The method of applying and curing a self-adhesive silicone rubber composition to molded resin has the serious problem that if the resin and silicone rubber are molded into a one-piece member using a mold, the silicone rubber itself sticks to the mold.

Where organohydrogenpolysiloxane is added to an organic resin, typically olefin resin, the properties of the resin itself can be altered thereby, preventing the resin from exerting its own properties. The physical engagement method leaves a possibility that the two segments be disengaged by physical forces. The use of an olefin resin having grafted thereto a compound having an aliphatic unsaturated group and a hydrolyzable group attached to a silicon atom cannot dispense with a primer when it should be joined to addition curing type silicone rubber. This is cumbersome and uneconomical.

To take advantage of the weatherability, heat resistance, cleanness and rubbery elasticity of silicone rubber, the demand that organic resin and silicone rubber be integrally molded into a one-piece article under curing conditions within a short time is increasing. Under the circumstances, addition curing type silicone rubber is believed best from the standpoints of brief curing and sealing properties. None of the prior art methods are successful in forming an effective bond between addition curing type silicone rubber and organic resin.

Therefore, an object of the present invention is to provide an adhesive silicone composition offering a cured product which is capable of forming an effective bond to organic resins, but smoothly releasable from molds.

SUMMARY OF THE INVENTION

According to the invention, there is provided an adhesive silicone composition comprising in admixture, (A) 100 parts by weight of a diorganopolysiloxane, (B) 0 to about 20 parts by weight of an organohydrogenpolysiloxane, (C) 0.01 to about 30 parts by weight of a compound, and (D) a catalytic amount of a platinum catalyst. Component (A) is a diorganopolysiloxane of the general formula (1):

$$R^1_a SiO_{(4-a)/2} \tag{1}$$

wherein $R^1$, which may be identical or different, is a substituted or unsubstituted monovalent hydrocarbon radical and letter a is a positive number in the range: $1.8<a<2.205$, containing at least two aliphatic unsaturated radicals in a molecule, and having a viscosity of about 10 to about 10,000,000 centipoise at 25° C. Component (B) is an organohydrogenpolysiloxane of the general formula (2):

$$R^2_b H_c SiO_{(4-b-c)/2} \tag{2}$$

wherein $R^2$, which may be identical or different, is a substituted or unsubstituted monovalent saturated hydrocarbon radical and letters b and c are positive numbers in the range: $0.8<b<2.2$, $0.002 \leq c \leq 1.0$ and $0.802<b+c \leq 3.0$, containing at least three hydrogen atoms each bonded to a silicon atom in a molecule. Component (C) is (C1) an organohydrogenpolysiloxane of the general formula (3):

$$Q_d R^3_e H_f Siz_{(4-d-e-f)/2} \tag{3}$$

wherein Q is a monovalent organic radical having at least one aromatic ring, $R^3$ is a substituted or unsubstituted monovalent hydrocarbon radical, Z is an oxygen atom or divalent hydrocarbon radical, at least one Z being an oxygen atom, and letters d, e, and f are positive numbers in the range: $0<d \leq 2$, $0 \leq e$, $0<f \leq 1$ and $d+e+f \leq 3.0$, containing at least two hydrogen atoms each bonded to a silicon atom in a molecule, the monovalent organic radical having an aromatic ring constituting at least 12 mol % of the entire monovalent organic radicals bonded to silicon atoms. Alternatively, component (C) is (C2) a compound having a radical of the general formula (4) or (5):

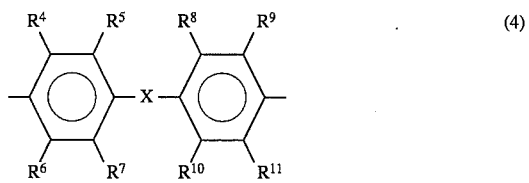

(4)

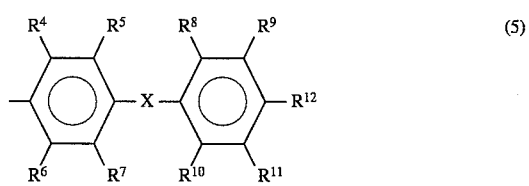

(5)

wherein $R^4$ to $R^{12}$ are independently selected from the group consisting of a hydrogen atom, halogen atom, substituted or unsubstituted monovalent hydrocarbon radical, and alkoxy radical, and X is a divalent radical selected from the group consisting of

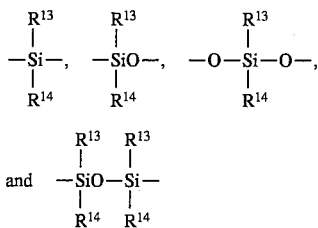

wherein $R^{13}$ and $R^{14}$ each are a substituted or unsubstituted monovalent hydrocarbon radical, containing at least one hydrogen atom bonded to a silicon atom in a molecule.

This adhesive silicone composition is of the addition curing type and quickly cures within a short time into a cured product which strongly adheres to organic resins such as ABS resins, but is releasable from silicone rubber-shaping frames, typically metal molds in a practically acceptable manner. Accordingly, the adhesive silicone composition of the addition curing type can be satisfactorily bonded to an organic resin through simple operation in an economically advantageous manner without a need for primers and without detracting from the organic resin's own characteristics.

BEST MODE FOR CARRYING OUT THE INVENTION

Figure 1A:
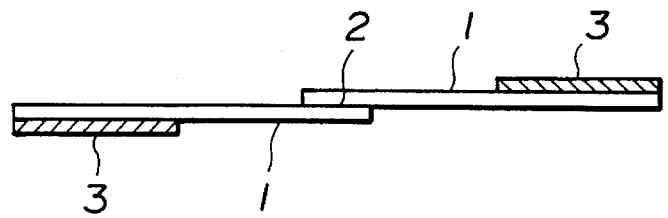
FIGS. 1A and 1B are side and plan views of an adhesion test piece used in Test 1.

A first component (A) of the adhesive silicone composition according to the present invention is a diorganopolysiloxane of the general formula (1):

(1)

containing at least two aliphatic unsaturated radicals in a molecule. This is a known organopolysiloxane used as a main ingredient of conventional addition curing type silicone rubber.

In formula (1), $R^1$ is a substituted or unsubstituted monovalent hydrocarbon radical and letter a is a positive number in the range: $1.8 \leq a \leq 2.205$, preferably $1.9 \leq a \leq 2.2$. Preferred examples of the hydrocarbon radical represented by $R^1$ include aliphatic unsaturated radicals having 2 to 8 carbon atoms such as vinyl, allyl, propenyl and butenyl; alkyl radicals having 1 to 10 carbon atoms such as methyl, ethyl, propyl, butyl, hexyl, cyclohexyl, and octyl; aryl radicals such as phenyl and tolyl; aralkyl radicals such as benzyl and phenylethyl; and substituted ones of these radicals wherein some or all of the hydrogen atoms bonded to a carbon atom are replaced by halogen atoms, such as 3,3,3-trifluoropropyl and chloromethyl. The $R^1$ radicals may be identical or different.

The organopolysiloxane of formula (1) should contain at least two aliphatic unsaturated radicals in a molecule while preferred aliphatic unsaturated radicals are alkenyl radicals such as vinyl and allyl. The remaining substituents are preferably methyl and phenyl. The content of aliphatic unsaturated radical in $R^1$ is preferably about 0.001 to about 20 mol %, especially about 0.025 to about 5 mol % of the entire $R^1$ radicals. The aliphatic unsaturated radical may be bonded to a silicon atom at the end or at any intermediate position of the molecular chain.

The organopolysiloxane of formula (1) may have a linear structure or branched structure containing a $R^1SiO_{3/2}$ or $SiO_{4/2}$ unit although a linear diorganopolysiloxane is preferred. It preferably has an average degree of polymerization of about 100 to about 10,000, especially about 200 to about 5,000. It has a viscosity of about 10 to about 10,000,000 centipoise at 25° C., preferably about 600 to about 200,000 centipoise at 25° C.

The diorganopolysiloxane may be prepared by any well-known method, for example, by effecting equilibration polymerization reaction between organocyclopolysiloxane and hexaorganodisiloxane in the presence of an alkali or acid catalyst.

Component (B) is a crosslinking agent which is optional. It is an organohydrogenpolysiloxane of the general formula (2):

(2)

containing at least three hydrogen atoms each bonded to a silicon atom in a molecule. In formula (2), $R^2$ is a substituted or unsubstituted monovalent saturated hydrocarbon radical and letters b and c are positive numbers in the range: $0.8 < b < 2.2$, $0.002 \leq c \leq 1$, $0.802 < b+c \leq 3.0$, preferably $1 \leq b \leq 2$, $0.01 \leq c \leq 0.5$, $1 \leq b+c \leq 2.5$. Illustrative examples of the hydrocarbon radical represented by $R^2$ are alkyl and substituted alkyl radicals as exemplified for $R^1$ in formula (1). The $R^2$ radicals may be identical or different.

No particular limit is imposed on the molecular structure of the organohydrogenpolysiloxane of formula (2). Any of linear, branched and cyclic structures as well as three-dimensional network structures may be used. Preferably it has an average degree of polymerization of less than about 300 and a viscosity of about 0.5 to about 5,000 centipoise preferably 1 to 3,000 cps at 25° C.

The organohydrogenpolysiloxane of formula (2) may be prepared by any well-known method, for example, simply by effecting equilibration between a compound selected from octamethylcyclotetrasiloxane and 1,3,5,7-tetramethyl-cyclotetrasiloxane and a compound containing a hexamethyldisiloxane or 1,1,3,3-tetramethyldisiloxane unit to form a terminal group in the presence of a catalyst (e.g., sulfuric acid, trifluoromethanesulfonic acid and methanesulfonic acid) at a temperature between −10° C. and +40° C.

Component (B) or organohydrogenpolysiloxane of formula (2) is blended in an amount of 0 to about 20 parts, preferably 0.1 to about 10 parts by weight per 100 parts by weight of component (A) or diorganopolysiloxane.

A third component is (C1) an organohydrogenpolysiloxane of the general formula (3):

(3)

wherein Q is a monovalent organic radical having at least one aromatic ring, $R^3$ is a substituted or unsubstituted monovalent hydrocarbon radical, Z is an oxygen atom or divalent hydrocarbon radical, at least one Z being an oxygen atom, and letters d, e, and f are positive numbers in the range: $0<d\leq 2$, $0\leq e$, $0<f\leq 1$ and $d+e+f\leq 3.0$, containing at least two hydrogen atoms each bonded to a silicon atom in a molecule, the monovalent organic radical having an aromatic ring constituting at least 12 mol % of the entire monovalent organic radicals bonded to silicon atoms. Alternatively, the third component is (C2) a compound containing at least one hydrogen atom bonded to a silicon atom in a molecule and having a radical of the general formula (4) or (5):

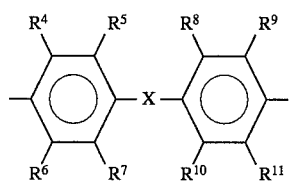
(4)

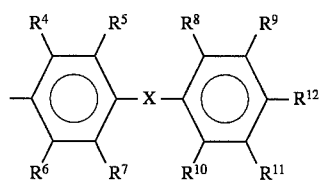
(5)

wherein $R^4$ to $R^{12}$ are independently selected from the group consisting of a hydrogen atom, halogen atom, substituted or unsubstituted monovalent hydrocarbon radical, and alkoxy radical, and X is a divalent radical selected from the group consisting of

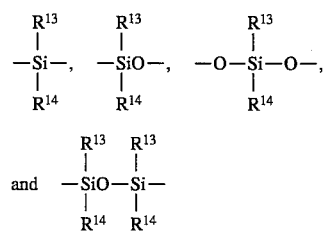

wherein $R^{13}$ and $R^{14}$ each are a substituted or unsubstituted monovalent hydrocarbon radical. The third component provides the inventive composition with an ability to strongly adhere to organic resins such as ABS resins and to smoothly separate from the metal mold where it is molded and cured.

Compound (C1) is first described. In formula (3), Q is an organic radical having at least one aromatic ring, preferably 1 to 3 aromatic rings. If the monovalent organic radical represented by Q contains more than 3 aromatic rings, the compound would be less compatible with siloxane and would not contribute to adhesion when a composition is solidified. Several illustrative examples of the organic radical represented by Q are given below.

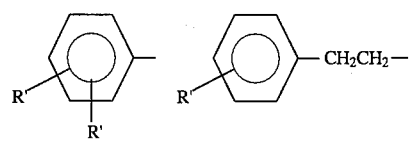

-continued

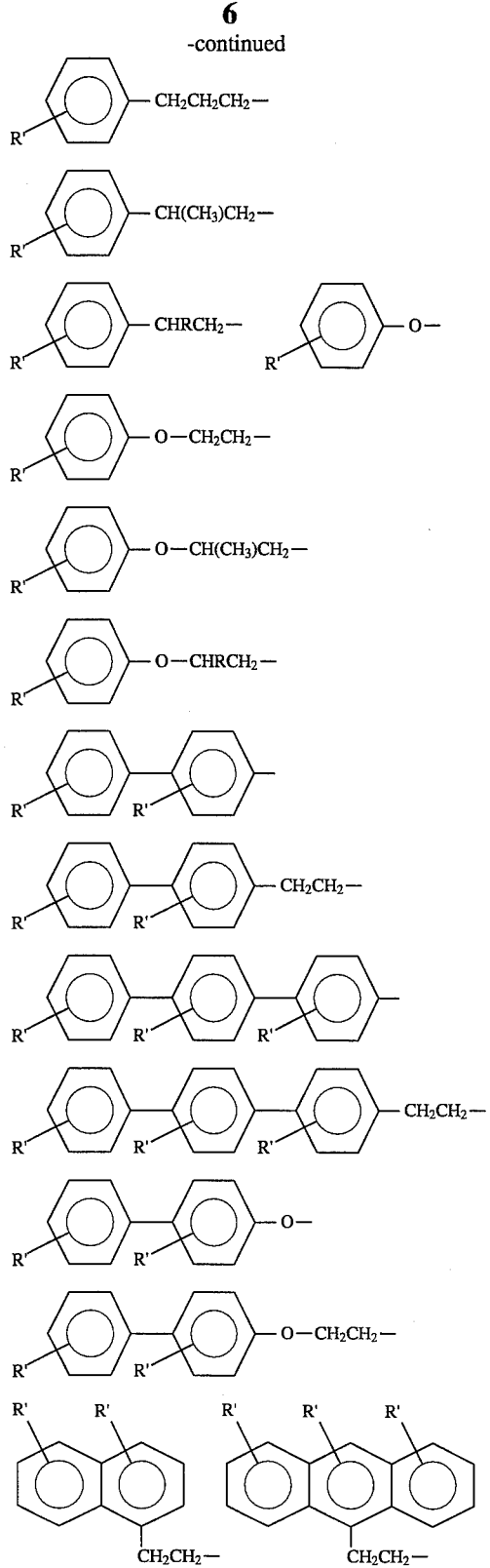

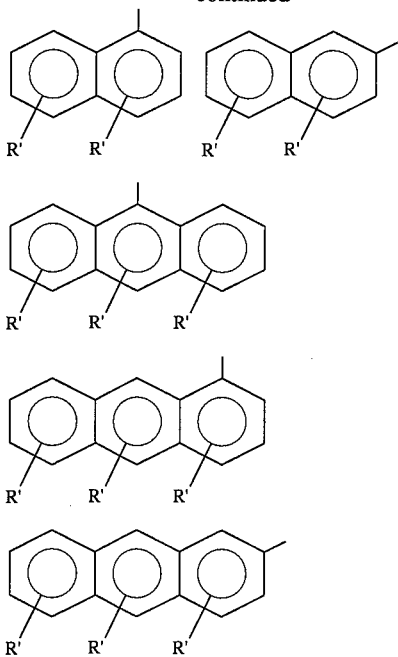

Note that R is a substituted or unsubstituted monovalent hydrocarbon radical as defined for $R^1$, and R' is a hydrogen atom or a substituted or unsubstituted monovalent hydrocarbon radical as defined for $R^1$.

In formula (3), $R^3$ is a substituted or unsubstituted monovalent hydrocarbon radical, preferably a substituted or unsubstituted monovalent aliphatic hydrocarbon radical (that is, excluding aromatic hydrocarbon radicals). Preferred examples include aliphatic unsaturated radicals having 2 to 8 carbon atoms such as vinyl, allyl, propenyl and butenyl; alkyl groups having 1 to 10 carbon atoms such as methyl, ethyl, propyl, butyl, hexyl, cyclohexyl and octyl; and substituted ones of these radicals wherein some or all of the hydrogen atoms attached to a carbon atom are replaced by halogen atoms or the like, such as chloromethyl, 3,3,3-trifluoropropyl, $C_4F_9CH_2CH_2$— and $C_8F_{17}CH_2CH_2$—. Z is an oxygen atom or divalent hydrocarbon radical. At least one Z radical is an oxygen atom. Exemplary divalent hydrocarbon radicals are those having 2 to 8 carbon atoms including alkylene radicals such as ethylene, propylene, tetramethylene, hexamethylene and methylethylene. Letters d, e, and f are positive numbers in the range: $0<d\leq2$, $0\leq e$, $0<f\leq1$ and $d+e+f\leq3.0$ The organohydrogenpolysiloxane of formula (3) should contain at least two, preferably at least three hydrogen atoms each bonded to a silicon atom in a molecule. The monovalent organic radical having an aromatic ring should constitute at least 12 mol %, preferably 15 to 80 mol %, more preferably 20 to 60 mol % of the entire monovalent organic radicals bonded to silicon atoms in the molecule. No satisfactory adhesion is achieved if the content of the aromatic ring-bearing organic radical is less than 12 mol %.

Where the organohydrogenpolysiloxane of formula (2) as component (B) is not blended in the composition of the invention, the organohydrogenpolysiloxane of formula (3) or compound of formula (4) or (5) as component (C) should preferably have such a number of hydrogen atoms bonded to a silicon atom that the total number of silicon atom-attached hydrogen atoms in a molecule of component (C) plus aliphatic unsaturated groups in a molecule of component (A) is 5 or more.

No particular limit is imposed on the molecular structure of the organohydrogenpolysiloxane of formula (3) and any of linear, cyclic and branched structures may be used. It preferably has a viscosity of about 1 to about 1,000,000 centipoise at 25° C.

Several illustrative, non-limiting examples of the organohydrogenpolysiloxane of formula (3) are given below.

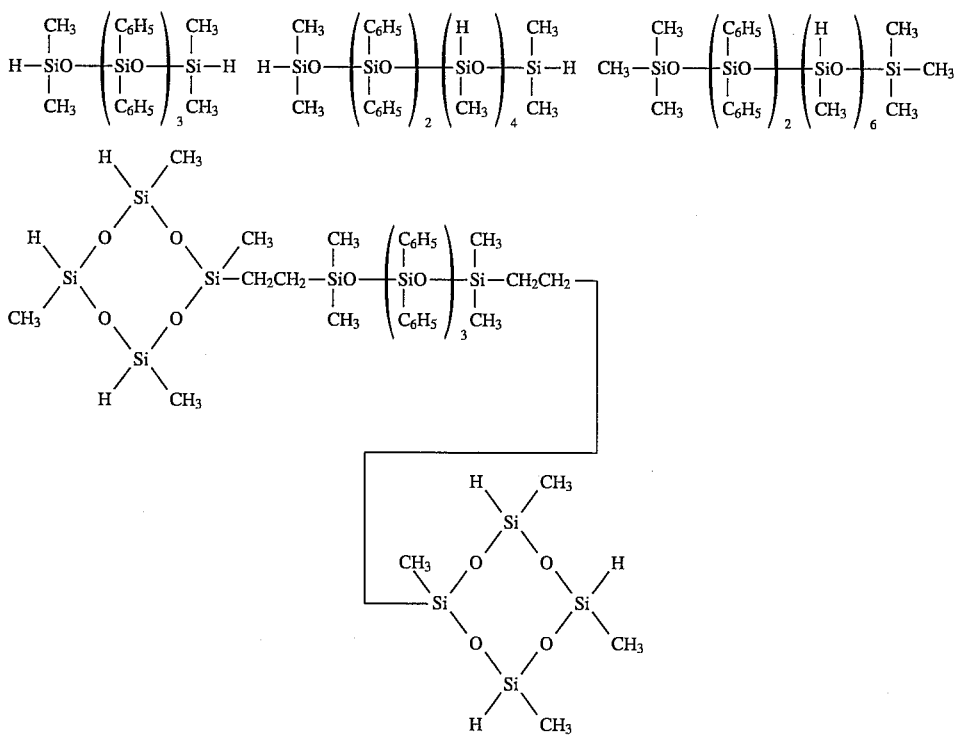

-continued
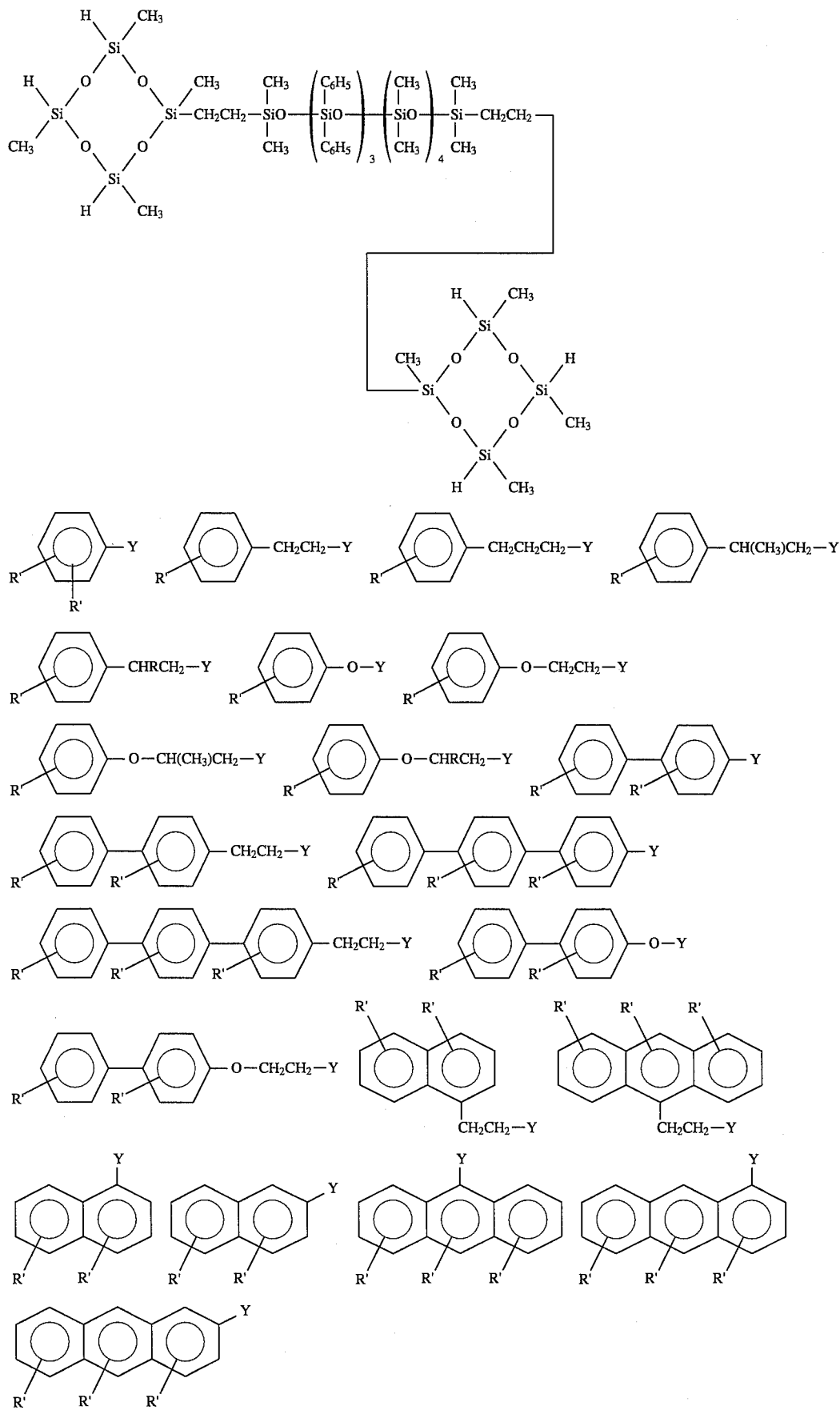

Note that R is a substituted or unsubstituted monovalent hydrocarbon radical as defined for $R^1$, R' is a hydrogen atom or a substituted or unsubstituted monovalent hydrocarbon radical as defined for $R^1$, and Y is a monovalent radical shown below.

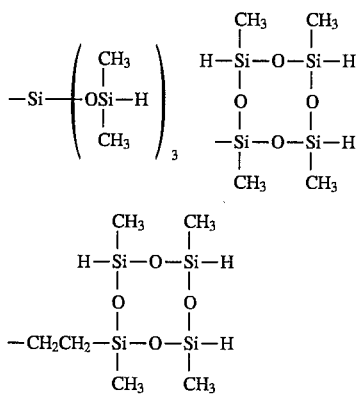

Also useful as component (C) is (C2) a compound containing at least one hydrogen atom bonded to a silicon atom and having a radical of formula (4) or (5) shown above. The substituted or unsubstituted monovalent hydrocarbon radical represented by $R^4$ to $R^{14}$ and other substituted or unsubstituted monovalent hydrocarbon radicals bonded to a silicon atom contained in the molecule are preferably those having 1 to 10 carbon atoms as described for $R^1$ in formula (1). The alkoxy radicals represented by $R^4$ to $R^{12}$ include those having 1 to 10 carbon atoms, especially 1 to 6 carbon atoms, such as methoxy, ethoxy, propoxy and butoxy. The halogen atoms represented by $R^4$ to $R^{12}$ include fluorine, chlorine and iodine.

Preferably, compound (C2) has a molecular weight of about 400 to about 100,000, especially about 400 to about 50,000 and contains at least two, more preferably at least three hydrogen atoms each bonded to a silicon atom (that is, SiH radicals) in a molecule. Preferably it contains 3 to about 100, especially 5 to about 50 silicon atoms in a molecule. Moreover, compound (C2) preferably has SiH-containing radicals which are shown below.

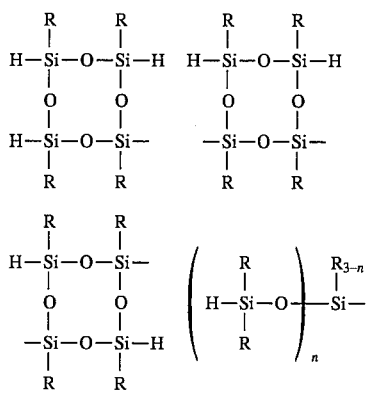

Note that R is a hydrogen atom or a substituted or unsubstituted monovalent hydrocarbon radical having 1 to 8 carbon atoms and letter n is a number of 1 to 3.

Illustrative examples of the compound (C2) are organohydrogenpolysiloxane compounds as shown below.

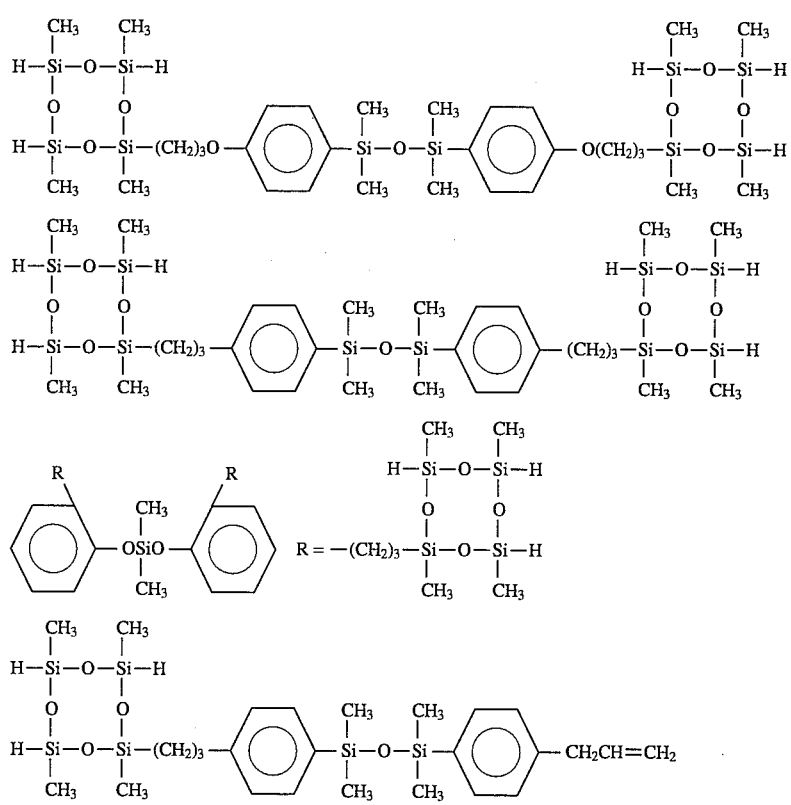

-continued

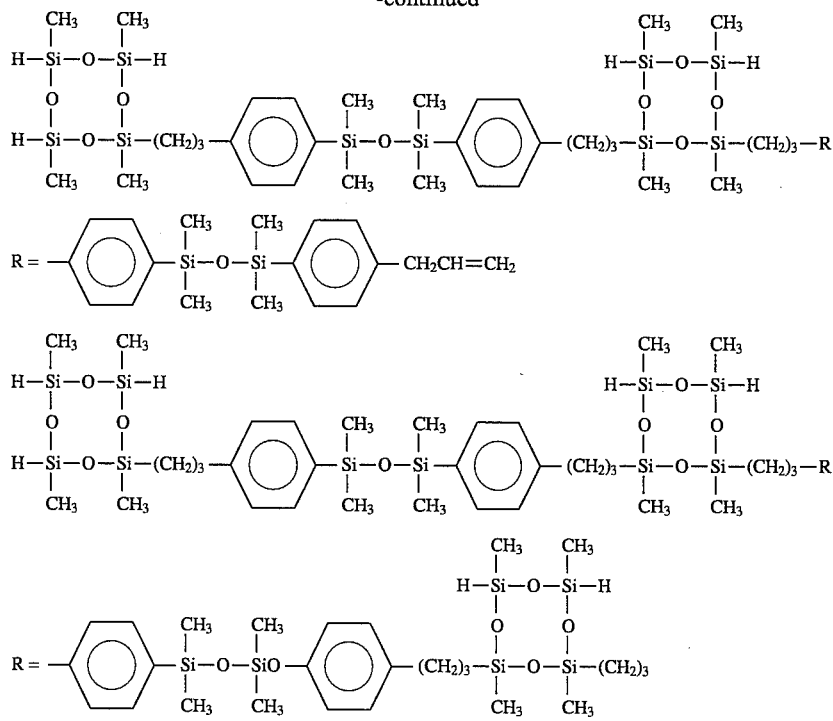

Component (C) is blended in an amount of 0.01 to about 30 parts, preferably 0.1 to about 20 parts by weight per 100 parts by weight of component (A). On this basis, less than 0.01 part of component (C) fails to achieve a practically acceptable bond whereas more than 30 parts of component (C) can detract from the physical properties of a cured product.

Further with respect to blending amounts, it is preferred that 0.4 to 10, especially 0.8 to 5 hydrogen atoms each attached to a silicon atom in components (B) and (C) are available per aliphatic unsaturated radical contained in the entire composition. If the amount of components (B) and (C) blended is below the range, curing would be insufficient or a cured product would have poor physical properties. If the amount of components (B) and (C) blended is beyond the range, curing would be insufficient or a cured product would have physical properties which vary with the lapse of time.

Component (D) of the adhesive silicone composition is a platinum catalyst which is selected from platinum and platinum compounds. The platinum catalyst is effective for promoting addition curing reaction or hydrosilylation between component (A) and components (B) and (C). Any well-known platinum catalyst may be used. Exemplary catalysts are elemental platinum, platinum black, chloroplatinic acid, alcohol-modified chloroplatinic acid, and complexes of chloroplatinic acid with various olefins, aldehydes, vinylsiloxanes and acetylene alcohol.

The platinum catalyst is used in a catalytic amount which may be determined in accordance with the desired curing rate. Preferably the catalyst is added such that about 1 to about 2,000 parts, especially about 1 to about 200 parts by weight of elemental platinum is available per million parts by weight of the composition.

In addition to the foregoing essential and optional components, the adhesive silicone composition of the invention may further contain other optional components. Where it is desired to impart strength to the composition, finely divided silica having a specific surface area of more than about 50 $m^2/g$ as measured by BET method is advantageously added. Examples of the reinforcing silica include Aerosil 130, 200 and 300 (commercially available from Nippon Aerosil K.K. and Degussa), Cabosil MS-5 and MS-7 (commercially available from Cabot Corp.), Rheorosil QS-102 and 103 (commercially available from Tokuyama Soda K.K.), and Nipsil LP (commercially available from Nippon Silica K.K.) as hydrophilic silica and Aerosil R-812, R-812S, R-972, and R-974 (commercially available from Degussa), Rheorosil MT-10 (commercially available from Tokuyama Soda K.K.), and Nipsil SS series (commercially available from Nippon Silica K.K.) as hydrophobic silica. Preferably the finely divided silica is added in amounts of about 0.5 to about 200 parts, especially about 5 to about 50 parts by weight per 100 parts by weight of component (A) or diorganopolysiloxane for the purpose of improving the properties of a cured product.

If it is desired to adjust the curing time in order that the composition be practical, there may be blended curing control agents, for example, vinyl group-containing organopolysiloxanes (e.g., vinylcyclotetrasiloxane), triallyl isocyanurate, alkyl maleates, acetylene alcohols and silane or siloxane modified products thereof, hydroperoxides, tetramethylethylenediamine, benzotriazole, and mixtures thereof. The control agent may be added in a conventional amount insofar as the object of the invention is not impaired.

It is also acceptable to add semi-reinforcing fillers such as ground quartz, diatomaceous earth, and calcium carbonate; coloring agents such as inorganic pigments (e.g., cobalt blue) and organic dyes; and agents for enhancing heat resistance and flame retardancy such as cerium oxide, zinc carbonate, manganese carbonate, iron oxide, titanium oxide, and carbon black. These agents may be added in conventional amounts insofar as the object of the invention is not impaired.

The adhesive silicone composition of the invention is advantageously used to form one-piece or composite articles with moldings of organic resins. Examples of the organic resin to which the composition can be joined include ABS resins, polystyrene resins, polycarbonate resins, polyester resins, epoxy resins, polyamide resins, polyacetal resins, and polyphenylene sulfide resins.

The adhesive silicone composition of the invention can be cured simply by heating to induce addition reaction. Although curing conditions are not critical, the composition may be heated at a temperature of about 60° to about 180° C. for about 1 second to about 360 minutes.

As described above, an adhesive silicone composition according to the invention quickly cures within a short time into a cured product which firmly adheres to organic resins including general-purpose resins such as ABS and polystyrene resins and engineering resins, but is releasable from silicone rubber-shaping frames such as metal molds in a practically acceptable manner. Therefore, the adhesive silicone composition of the addition curing type can satisfactorily bond to an organic resin through simple operation in an economically advantageous manner without a need for primers and without detracting form the organic resin's own characteristics.

EXAMPLE

Examples of the invention are given below by way of illustration and not by way of limitation. All parts are by weight.

Reference Example

A kneader was charged with 100 parts of dimethylpolysiloxane blocked with a dimethylvinylsilyl radical at each end and having a viscosity of 10,000 centipoise at 25° C., 40 parts of fumed silica having a specific surface area of 300 cm²/g, 8 parts of hexamethyldisilazane, and 1 part of water. The ingredients were agitated and mixed for one hour at room temperature and then heated to 150° C. and mixed for a further 2 hours at the temperature. Thereafter, the mixture was cooled down to room temperature. To the mixture were added 20 parts of the dimethylpolysiloxane blocked with a dimethylvinylsilyl group at each end and having a viscosity of 10,000 centipoise at 25° C., 3 parts of hydrogenmethylpolysiloxane as shown below having a viscosity of about 10 centipoise at 25° C., 4 parts of vinylmethylpolysiloxane containing 5 mol % of a vinyl radical directly bonded to a silicon atom calculated as —Si(CH₃)(CH=CH₂)O— unit and having a viscosity of 1,000 centipoise at 25° C., 0.1 part of acetylene alcohol for extending the time to curing at room temperature, and 50 ppm calculated as elemental platinum of a platinum vinylsiloxane complex. The mixture was thoroughly mixed until uniform, obtaining a liquid silicone rubber composition of the addition curing type.

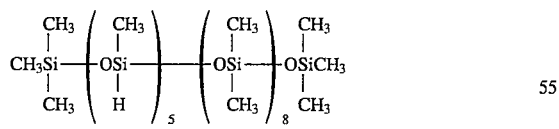

The silicone composition was placed in a press mold at 120° C. and heated therein for 10 minutes, obtaining a sheet. Its mechanical properties measured according to JIS K 6301 are shown below.

Hardness (JIS A scale): 40
Elongation: 500%
Tensile strength: 100 kgf/cm²
Tear strength: 35 kgf/cm Examples 1–12

To 100 parts by weight of the liquid, addition curing type silicone rubber composition prepared in Reference Example was added each of compounds (I) to (VI) of the structure shown below in an amount shown in Table 1. Adhesive silicone compositions were obtained.

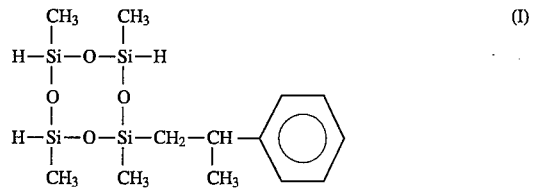

(I)

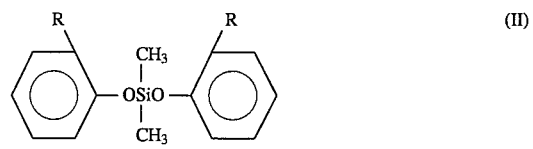

(II)

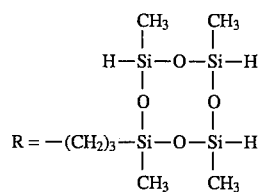

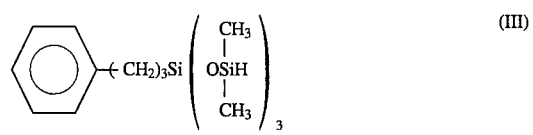

(III)

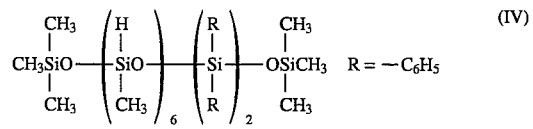

(IV)

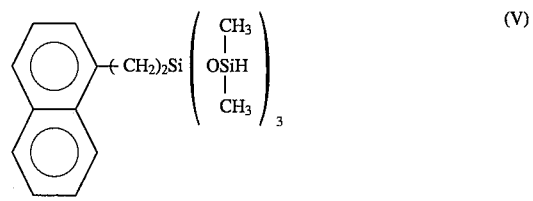

(V)

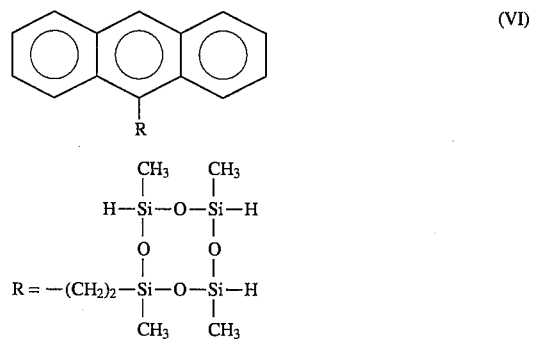

(VI)

Comparative Example 1

For comparison purpose, the liquid, addition curing type silicone rubber composition prepared in Reference Example was used as an adhesive silicone composition without adding compounds (I) to (VI).

The thus obtained adhesive silicone compositions were examined for adhesion and release by the following tests.

Adhesion test 1

An ABS resin was admitted into a thermoplastic resin injection molding machine where the resin was plasticized at 230° C. and injected into a plurality of sheet-shaped mold cavities whereby a plurality of sheets of 25 mm wide, 100 mm long, and 2 mm thick were molded. The injection molding conditions included an injection time of 6 seconds, a cooling time of 20 seconds, an injection pressure of 100 kg/cm², a clamping pressure of 35 ton, and a cavity temperature of 80° C.

Figure 1B:
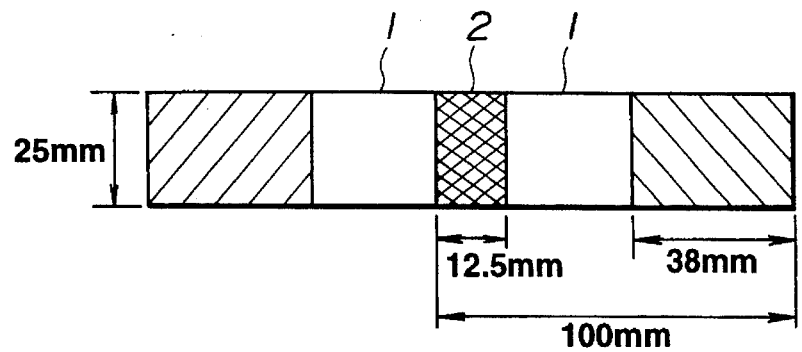
Figure 6:
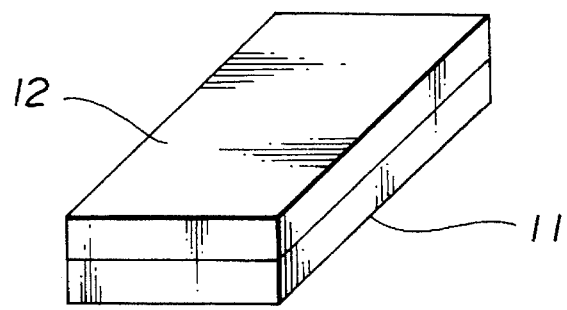
FIG. 6 is a perspective view of a test piece resulting from the injection molding process of FIGS. 2 to 5, which is subject to Test 2.

To a jig for forming tensile shear adhesion test pieces was fixedly attached each of the ABS resin sheets or each of chromium-plated metal, nickel-plated metal and aluminum alloy sheets of the same dimensions. A proper amount of the silicone rubber composition was poured into the jig where it was cured by heating for 8 minutes in a 100° C. constant temperature oven, obtaining a test piece as shown in the side and plan views of FIGS. 1A and 1B. In FIG. 1, a pair of resin or metal sheets 1 are joined together through the silicone composition in the overlapping or bond area 2 of 12.5 mm long. On the sheets 1 at opposite ends were placed supports 3 of the same material sized 25 mm×38 mm×2 mm (thick). The test pieces were examined by an adhesion test. The results are shown in Table 1.

TABLE 1

|  | Example | | | | | | | | | | | | |
| --- | --- | --- | --- | --- | --- | --- | --- | --- | --- | --- | --- | --- | --- |
|  | E1 | E2 | E3 | E4 | E5 | E6 | E7 | E8 | E9 | E10 | E11 | E12 | CE |
| Component (C), pbw | | | | | | | | | | | | | |
| Compound (I) | 0.5 | 1 | — | — | — | — | — | — | — | — | — | — | — |
| Compound (II) | — | — | 0.5 | 1 | — | — | — | — | — | — | — | — | — |
| Compound (III) | — | — | — | — | 0.5 | 1 | — | — | — | — | — | — | — |
| Compound (IV) | — | — | — | — | — | — | 0.5 | 1 | — | — | — | — | — |
| Compound (V) | — | — | — | — | — | — | — | — | 0.5 | 1 | — | — | — |
| Compound (VI) | — | — | — | — | — | — | — | — | — | — | 0.5 | 1 | — |
| Adherend | | | | | | | | | | | | | |
| Cr-plated metal | | | | | | | peeled | | | | | | peeled |
| Ni-plated metal | | | | | | | peeled | | | | | | peeled |
| Al alloy | | | | | | | peeled | | | | | | peeled |
| ABS resin | | | | | | | bonded | | | | | | peeled |

As is evident from Table 1, the adhesive silicone compositions within the scope of the invention (Examples 1–12) firmly adhere to the ABS resin, but not to the chromium-plated metal, nickel-plated metal and aluminum alloy which represent metals used to form molds. That is, the compositions show good release from metals.

Adhesion test 2

The adhesive silicone compositions of Examples 1 to 4 were examined for adhesion as follows.

Figure 2:
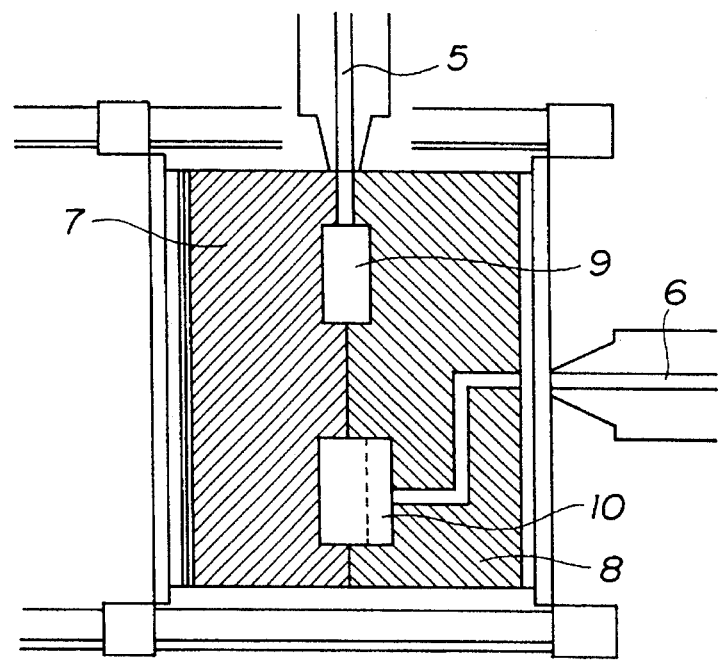
FIG. 2 is a schematic view of an injection molding machine used to form a test piece in Test 2.

Injection molding was carried out using a two-color injection molding machine equipped with a pair of injectors as shown in FIG. 2. The injection molding machine includes a mold consisting of a pair of left and right mold halves 7 and 8 and a pair of injection nozzles 5 and 6 associated therewith. The mold halves 7 and 8 are provided with recesses on the opposed surfaces and mated to define cavities 9 and 10. The nozzle 5 is positioned so as to inject a fluid into one cavity 9 along the parting line between the mold halves. The nozzle 6 is positioned at the center of the side surface of the right mold half 8 so as to inject a fluid into the other cavity 10.

Figure 3:
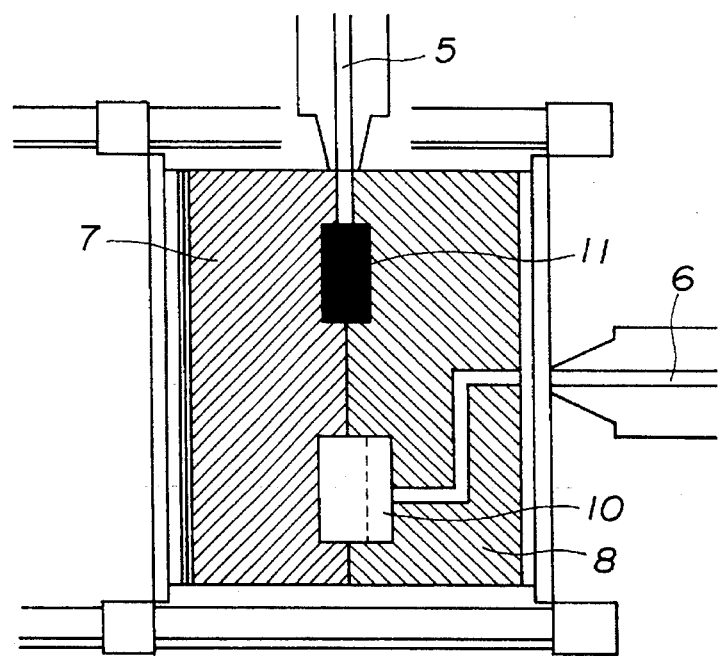
FIG. 3 is a similar view to FIG. 2 at a stage when ABS resin is injected into an upper cavity.

First, an ABS resin was admitted into the injection molding machine where it was melted at 240° C. and injected into the cavity 9 through the nozzle 5 to form a resin sheet form 11 as shown in FIG. 3. The injection molding conditions included an injection time of 6 seconds and a cooling time of 35 seconds, and the cavity 9 and left mold half 7 was at a temperature of 60° C.

Figure 4:
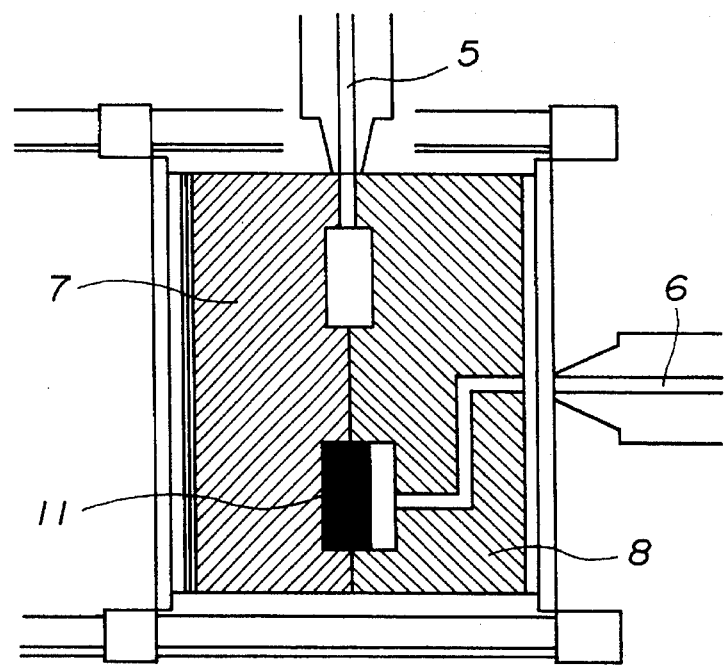
FIG. 4 is a similar view to FIG. 2 at a stage when the left mold half is inverted.

Next, the mold clamp was relieved. The right mold half 8 was removed. The left mold half 7 was rotated 180° with the resin sheet form 11 retained in its recess. The right mold half 8 was mated again and the mold clamp was fastened. As shown in FIG. 4, the recess in the mold half 8 defined with the exposed surface of the resin sheet form 11 a cavity for receiving silicone liquid to form a silicone rubber sheet form therein.

Figure 5:
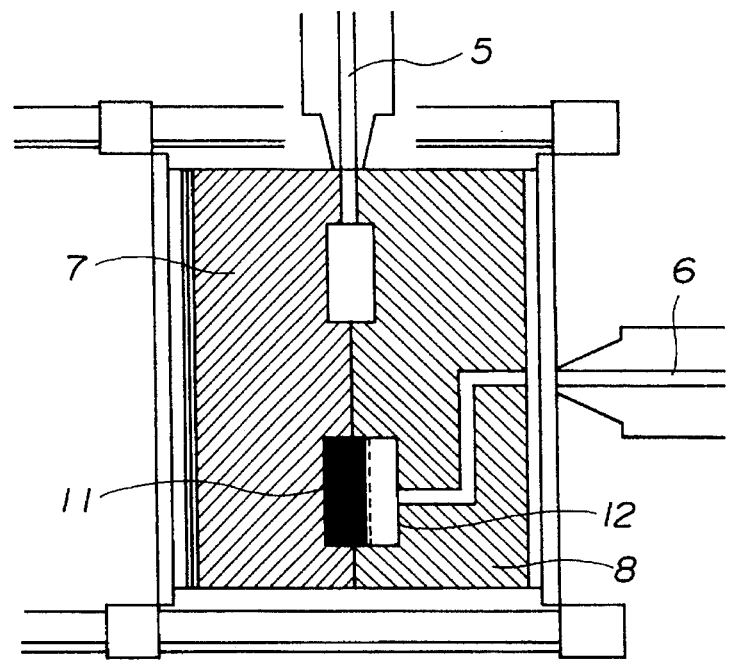
FIG. 5 is a similar view to FIG. 2 at a stage when an adhesive silicone composition is injected into a lower cavity.

Thereafter, an adhesive silicone composition was injected into the cavity 10 against the exposed surface of the resin sheet form 11 through the nozzle 6 as shown in FIG. 5, forming a rubber sheet form 12. The injection molding conditions included an injection time of 6 seconds and a curing time of 100 seconds, a left mold half 7 temperature of 60° C., and a right mold half 8 temperature of 80° C.

Through the injection molding process described above, there was obtained a composite article of ABS resin sheet 11 and silicone rubber sheet 12 each sized 2.5 mm wide by 15 cm long by 2 mm thick.

All the composite articles of the adhesive silicone compositions of Examples 1 to 4 with ABS resin showed a firm bond therebetween as well as high dimensional precision and productivity.

Adhesion was similarly examined using a chromium-plated carbon steel block instead of the ABS resin. All the silicone rubber sheets readily separated from the steel block. Therefore, the adhesive silicone compositions are readily releasable from metal molds.

Japanese Patent Application No. 147050/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An adhesive silicone composition comprising in admixture, (A) 100 parts by weight of a diorganopolysiloxane of the general formula (1):

$$R^1_a SiO_{(4-a)/2} \qquad (1)$$

wherein $R^1$, which may be identical or different, is a substituted or unsubstituted monovalent hydrocarbon radical and letter a is a positive number in the range: $1.8 \leq a \leq 2.205$, containing at least two aliphatic unsaturated radicals in a molecule, and having a viscosity of about 10 to about 10,000,000 centipoise at 25° C., (B) 0 to about 20 parts by weight of an organohydrogenpolysiloxane of the general formula (2):

$$R^2_b H_c SiO_{(4-b-c)/2} \qquad (2)$$

wherein $R^2$, which may be identical or different, is a substituted or unsubstituted monovalent saturated hydrocarbon radical and letters b and c are positive numbers in the range: $0.8 < b < 2.2$, $0.002 \leq c \leq 1.0$ and $0.802 < b+c \leq 3.0$, containing at least three hydrogen atoms each bonded to a silicon atom in a molecule, (C) 0.01 to about 30 parts by weight of (C1) an organohydrogenpolysiloxane of the general formula (3):

$$Q_d R^3_e H_f SiZ_{(4-d-e-f)/2} \qquad (3)$$

wherein Q is a monovalent organic radical having at least one aromatic ring, $R^3$ is a substituted or unsubstituted monovalent hydrocarbon radical, Z is an oxygen atom or divalent hydrocarbon radical, at least one Z being an oxygen atom, and letters d, e, and f are positive numbers in the range: $0<d\leq 2$, $0\leq e$, $0<f\leq 1$ and $d+e+f\leq 3.0$, containing at least two hydrogen atoms each bonded to a silicon atom in a molecule, the monovalent organic radical having an aromatic ring constituting at least 12 mol % of the entire monovalent organic radicals bonded to silicon atoms, or (C2) a compound having a radical of the general formula (4) or (5):

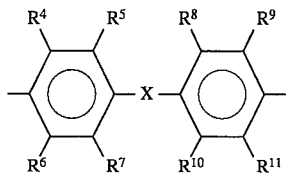

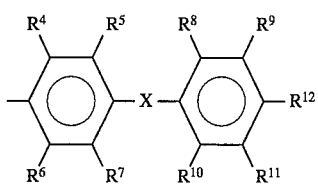

wherein $R^4$ to $R^{12}$ are independently selected from the group consisting of a hydrogen atom, halogen atom, substituted or unsubstituted monovalent hydrocarbon radical, and alkoxy radical, and X is a divalent radical selected from the group consisting of

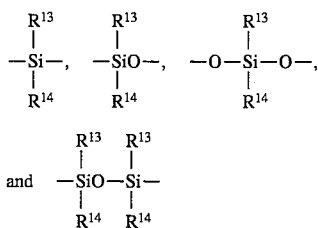

wherein $R^{13}$ and $R^{14}$ each are a substituted or unsubstituted monovalent hydrocarbon radical, containing at least one hydrogen atom bonded to a silicon atom in a molecule, and (D) a catalytic amount of a platinum catalyst.

* * * * *